UNITED STATES PATENT OFFICE.

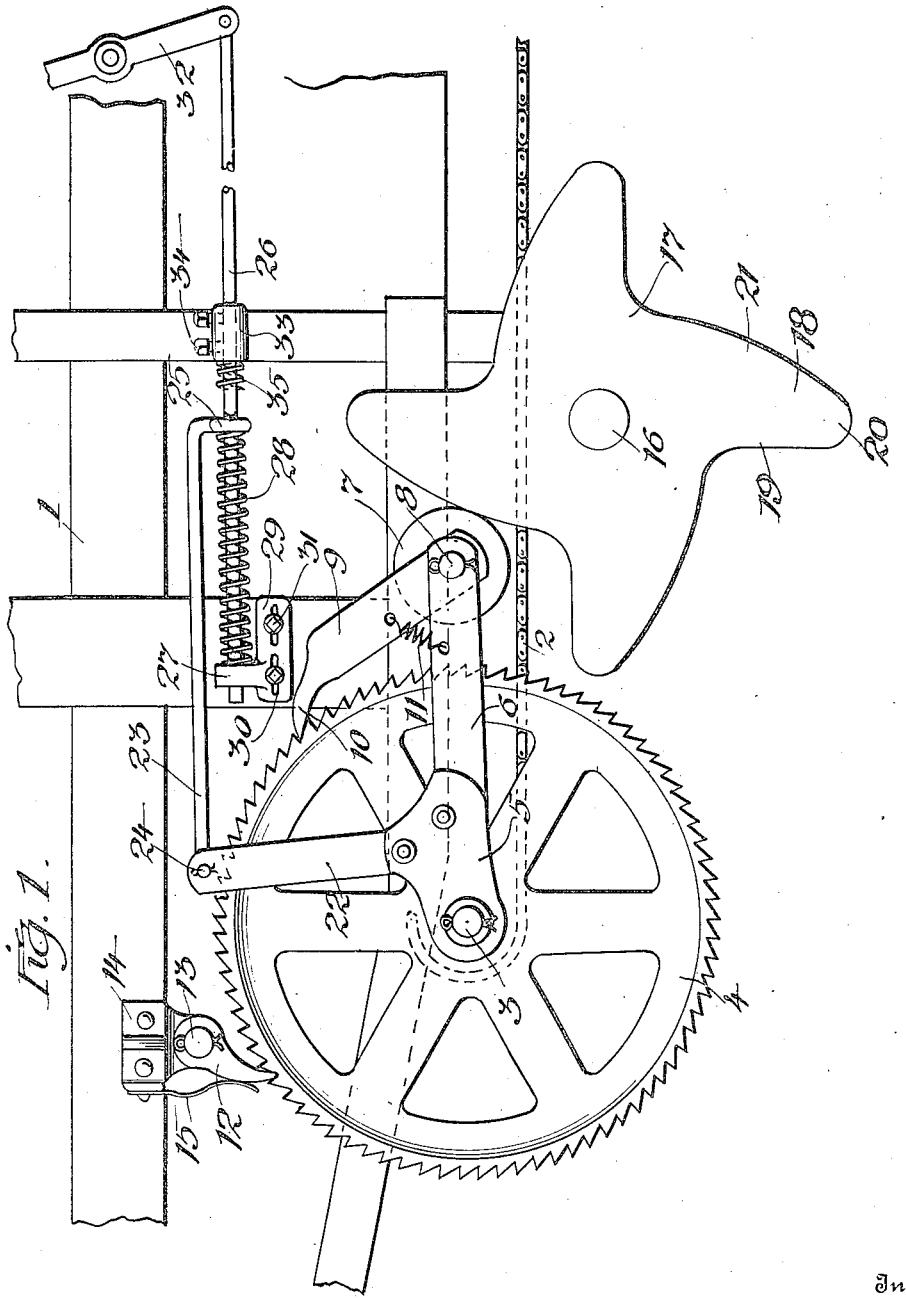

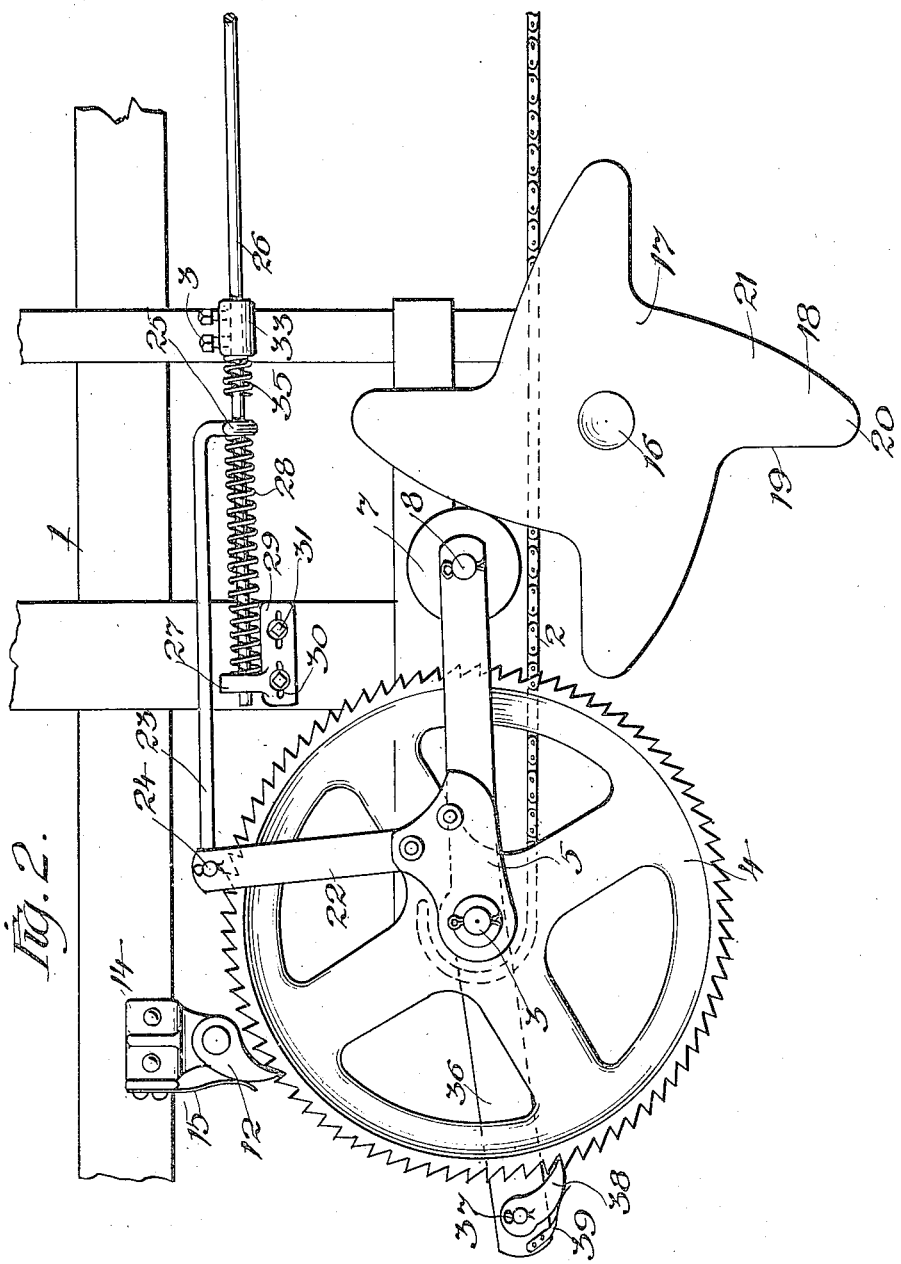

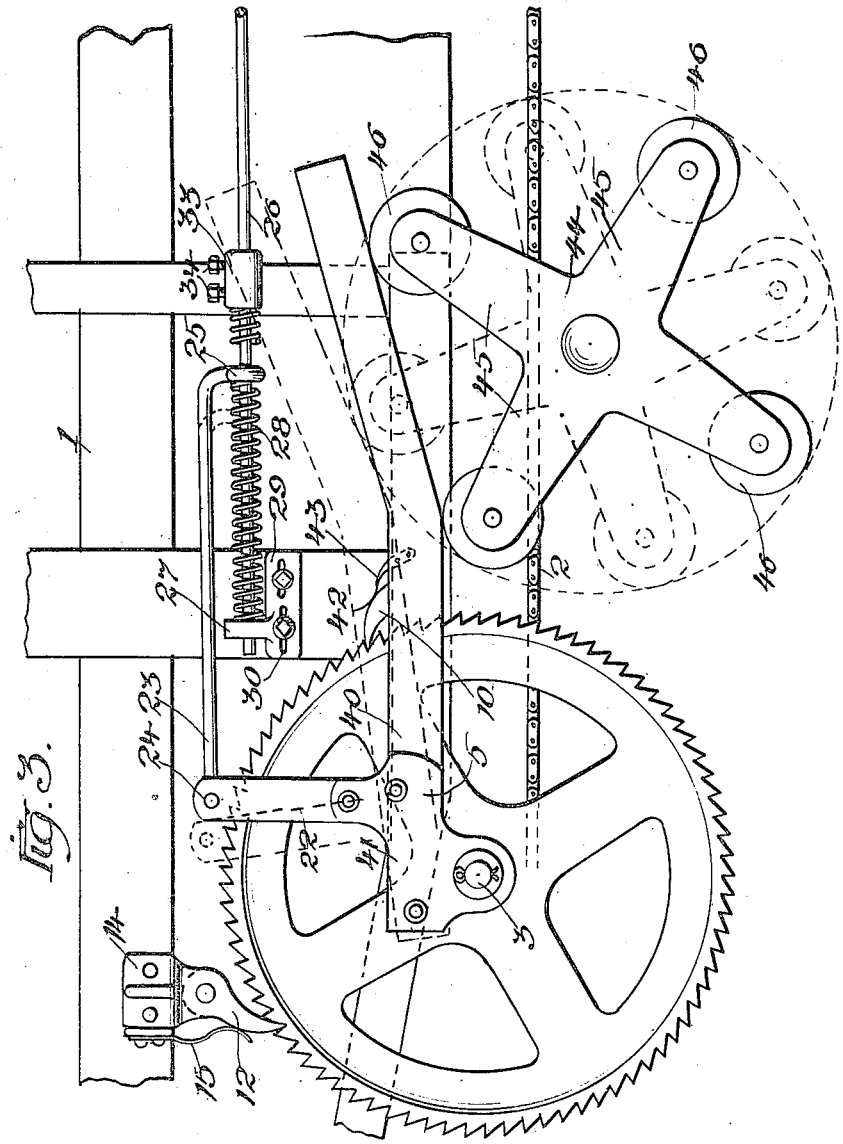

HENRY SYNCK, OF COLDWATER, OHIO, AND BRUCE B. ROLLMAN, OF PITTSBURGH, PENNSYLVANIA, ASSIGNORS, BY MESNE ASSIGNMENTS, TO THE NEW IDEA SPREADER COMPANY, OF COLDWATER, OHIO, A CORPORATION OF OHIO.

FEEDING MECHANISM.

1,392,720.   Specification of Letters Patent.   Patented Oct. 4, 1921.

Application filed June 4, 1918. Serial No. 238,231.

*To all whom it may concern:*

Be it known that we, HENRY SYNCK and BRUCE B. ROLLMAN, citizens of the United States, residing at Coldwater, and Pittsburgh, respectively, in the counties of Mercer and Allegheny, respectively, and States of Ohio and Pennsylvania, respectively, have invented certain new and useful Improvements in Feeding Mechanisms, of which the following is a specification.

This invention relates to mechanisms for feeding the conveyers of manure spreaders with a step by step movement and is designed more particularly as an improvement on the structure shown in patent issued March 6, 1917, No. 1,218,491. In the patented structure one of the conveyer shafts has fixed upon it a ratchet wheel, and an arm rocks about this shaft and at its outer end rides upon a rotary cam comprising a number of cam arms which successively engage the rocking arm to impart rocking motion thereto, the said rocking arm carrying a pawl which coacts with the ratchet wheel. In this structure, however, the arms of the cam have relatively straight receding faces and as each arm leaves or passes the roller upon the outer end of the pawl-carrying arm above-mentioned, the said roller is permitted to drop upon the advancing face of the next arm of the cam or the elements of the means provided for limiting the movement of the pawl carrying arm are brought into forceful contact. The impact is, of course, injurious both to the cam and to the roller which is carried by the pawl-carrying arm, the faces of the cam arm becoming battered as also the surface of the roller, or the movement limiting means for the arm is jarred. Furthermore, the mechanism in operation is more or less noisy. In consideration of the foregoing it is the primary object of the present invention to provide in a mechanism of this class, a construction and assemblage of parts such that the roller upon the pawl-carrying arm will not drop off from the ends of the cam arms as they pass or leave the said roller but will be caused to smoothly follow the receding faces of the cam arms as well as the advancing faces thereof. Therefore, the operation of the mechanism embodying the present invention is much smoother than in the instance of the patented structure and it is, furthermore, practically noiseless.

Another object of the invention is to provide novel means for holding the pawl-carrying arm in a direction to cause the roller thereon to bear firmly against the advancing and receding faces of the cam, means being also provided whereby the tension of the holding means may be varied as desired.

A further object of the invention is to provide means whereby the throw of the pawl-carrying arm may be lengthened or shortened so as to vary the length of the step by step movement of the conveyer apron.

In the accompanying drawings—

Figure 1 is a side elevation of the mechanism embodying the present invention;

Fig. 2 is a similar view illustrating a modification of the invention;

Fig. 3 is a similar view illustrating a further modification.

In the drawings the numeral 1 indicates one side of the body or box of a manure spreader which spreader embodies the usual conveyer chain indicated by the numeral 2 and passing about a sprocket (not shown) fixed upon a shaft 3 located at the rear end of the machine, the said shaft being the rear shaft of the conveyer and also having mounted fixedly upon it a ratchet wheel indicated by the numeral 4. A casting 5 is loosely mounted upon the end of the shaft 3 beside the ratchet wheel 4 and consequently may have oscillatory movement independently of the rotative movement of the said ratchet wheel or the shaft 3. An arm 6 extends from the casting 5 and at its outer end carries a roller indicated by the numeral 7 which roller is to co-act with the cam in a manner to be presently described. Pivotally connected with the outer end of the arm 6 preferably by being mounted upon the spindle for the roller 7, which spindle is indicated by the numeral 8, is a pawl 9 having a terminal tooth 10 which co-acts with the teeth of the ratchet wheel 4. A spring 11 is connected at one end of the arm 6 and at its other end to the pawl 9 and yieldably holds the pawl in position with its tooth 10 engaging the teeth of the said ratchet wheel. Of course in the oscillatory movement of the arm 6 and in the upward throw of the arm, the pawl 9 will act to rotate the ratchet wheel 4 in a reverse direction, and in the downward throw of the arm 6, the tooth of the pawl will merely ride over the teeth of the ratchet wheel without rotating the said wheel. In order to prevent backward rotation of the ratchet wheel, a pawl 12 is pivotally mounted as at 13 upon a bracket 14 secured to the side of the body or box of the spreader and this pawl is yieldably held, by means of a spring 15, in engagement with the teeth of the ratchet wheel 4.

The numeral 16 indicates the rear axle of the machine and mounted upon the said axle and connected by any suitable fastening or clutch device, as is usual, with the said axle for rotation therewith, is the cam member of the mechanism indicated in general by the numeral 17. The said cam includes a number of substantially radial cam arms 18 each having an approximately straight and radial advancing face 19, a round end 20, and an outwardly curved receding face 21. As will be presently explained, means is provided for yieldably holding the arm 6 in position with the roller 7 riding against the faces of the cam arms 18, whether the advancing faces 19, end faces 20, or receding faces 21, and it will be readily understood that as the cam rotates the advancing face of each arm will first engage the roller 7 and in the upward and forward travel of the arm, the roller will ride along said advancing face and to and over the end face 20, the arm 6 being at such time thrown upwardly. As the roller 7 leaves the end face 20 of each arm of the cam, it travels downwardly along the outwardly curved receding face 21 of the said arm and thence onto the advancing face 19 of the next arm of the cam. It will be evident that inasmuch as the roller 7 is held at all times in rolling contact with one or another of the faces of the cam arms, the roller will not be suddenly dropped upon each arm of the cam as the preceding arm passes the said roller, but on the other hand, the up and down throw or oscillatory movement of the arm 6 will be even and smooth, and the operation of the mechanism will not be attended by a battering of the co-active parts and the noise attending the impact of parts against one another.

The means provided for yieldably holding the arm 6 in a downward direction so as to hold the roller 7 at all times in contact with the cam, includes an arm 22 secured at its lower end to the casting 5 and extending upwardly from the said casting. A rod 23 is pivotally connected at its rear end as at 24 to the upper end of the arm 22, and the forward end of the rod 23 is bent downwardly and formed with an eye 25, which slidably fits a rod 26 slidably mounted at its rear end in a suitable bearing bracket 27 upon the side 1 of the box or body of the machine. A spring 28 is disposed upon the rod 26 and this spring at its forward end bears against the eye 25 of the rod 23 and at its rear end against the bearing portion of the bracket 27. The bracket 27 includes an attaching plate portion 29 formed with alined slots 30 through which are passed bolts 31 adjustably threaded into suitable sockets provided upon the side 1 of the box of the machine. At this point it will be apparent that in the oscillatory motion of the arm 6 and the corresponding movement of the arm 2, the rod 23 will be reciprocated and the eye 25 will be slid back and forth upon the rod 26. However, the spring 28 exerts pressure in a forward direction against the rod 23 and as a consequence the spring tends to swing the arm 6 in a downward direction and in this manner the roller 7 is held at all times in rolling contact with the faces of the arm and the cam 17. Of course, in the upward throw of the arm 6, the spring 28 will be compressed and in the downward throw of this arm the spring will be permitted to expand. By loosening the bolts 31 and adjusting the attaching plate 29 of the bearing bracket 27, the tension of the spring 28 may, of course, be increased or decreased as desired.

The rod 26 leads forwardly and at its forward end is connected to a hand lever 32 located at the forward end of the machine. A sleeve 33 is fixed by means of set bolts 34, upon the rod 26 at a point a suitable distance in advance of the eye 25 and the rod 23 and a short compression spring 35 is disposed upon the said rod 26 and in position between the rear end of the sleeve 33 and the forward side of the eye 25. It will be understood by reference to Fig. 1 of the drawings that the longitudinal adjustment of the rod 26 through the operation of the hand lever 32 will not in any way affect the sliding movement of the eye upon the said rod 26 nor will it affect the action of the spring 28. However, the sleeve 33 is designed to serve as a stop for limiting the forward sliding movement of the eye 25, the spring 35 serving as a buffer to receive the impact of the eye 25. Thus when it is desired to shorten the step by step movements of the conveyer apron, as for example, when the manure is being fed too rapidly to the spreading mechanism, the hand lever 32 may be rocked so as to rearwardly move the rod 26 and bring the sleeve 33 into position to limit the forward sliding movement of the rod 23.

The foregoing description of the invention refers more particularly to the form thereof shown in Fig. 1 of the drawings. However, the form of the invention shown in Fig. 2 is substantially identical with the form shown in Fig. 1 and the foregoing description applies to Fig. 2 substantially in its entirety, corresponding parts in the two figures being indicated by like reference numerals. In the modified structure, however, the pawl 9 is omitted as also its spring 11, and the arm 6 extends not only forwardly from the casting 5 but also rearwardly therefrom as indicated by the numeral 36 and the said arm 36 has pivoted to it as at 37 a pawl 38 which serves the same purpose as the pawl 9 previously described. A spring 39 bears against the pawl 38 and serves to hold the same in engagement with the teeth of the ratchet wheel 4.

The form of the invention shown in Fig. 3 of the drawings is somewhat similar to the forms above described except that in the last mentioned form, the arm 6 is replaced by an arm 40 which extends forwardly from the casting 41 loosely mounted for oscillatory movement of the shaft 3. The arm 40 carries a pivoted pawl 42 held by a spring 43 in engagement with the teeth of the ratchet wheel. In this form of the invention the cam 17 is replaced by a rotary hub 44 having radial arms 45 each carrying a wheel or roller 46 at its outer end, the rollers being designed to successively ride against the under side of the arm 40 in the rotation of the member comprising the said hub 44 and arms 45. Of course, in this form of the invention substantially the same desirable results are obtained as in the two forms previously described, inasmuch as none of the rollers 46 leave the under side of the arm 40 until at the moment the succeeding roller has come into contact with the said arm.

Having thus described the invention, what is claimed as new is:

1. In mechanism of the class described, the combination of a shaft, a ratchet on said shaft, an oscillatory member pivoted coaxially with the shaft and provided with two arms, a pawl operated by said member for operating the ratchet in one direction, a rotary cam adapted to operate one of the arms in one direction to step up the ratchet, a rod connected to the other arm, a spring applied to the rod to retract said member, and a spring to cushion the retractile stroke of the member.

2. In mechanism of the class described, the combination of a shaft, a ratchet on said shaft, an oscillatory member pivoted coaxially with the shaft and provided with two arms, a pawl operated by said member for operating the ratchet in one direction, a rotary cam adapted to operate one of the arms in one direction to step up the ratchet, a rod connected to the other arm, a spring applied to the rod to retract said member, an adjustable stop for the retractile movement of the member, and a spring for cushioning the stopping of the member by the stop.

3. In mechanism of the class described, a shaft, an oscillatory member, a rotary cam member, an arm extending from the oscillatory member in the path of movement of the cam member and continuously engaging the same, a longitudinally adjustable rod, a second arm extending from the oscillatory member, a rod connected with the last-mentioned arm and slidably engaging the first-mentioned rod, a spring upon the first-mentioned rod acting against the second-mentioned rod and tending to move the same in one direction, and a stop upon the first mentioned rod for limiting the movement of the second-mentioned rod.

4. In mechanism of the class described, a shaft, an oscillatory member, a rotary cam member, an arm extending from the oscillatory member in the path of movement of the cam member and continuously engaging the same, a longitudinally adjustable rod, a second arm extending from the oscillatory member, a rod connected with the last-mentioned arm and slidably engaging the first-mentioned rod, a spring upon the first mentioned rod acting against the second-mentioned rod and tending to move the same in one direction, and an abutment member adjustably fitted upon the first-mentioned rod and arranged for coaction with the second-mentioned rod to limit the movement thereof.

5. In mechanism of the class described, a shaft, an oscillatory member, a rotary cam member, an arm extending from the oscillatory member in the path of movement of the cam member and continuously engaging the same, a longitudinally adjustable rod provided with an abutment, a second arm extending from the oscillatory member, a rod connected with the last-mentioned arm and slidably engaging the first-mentioned rod, a spring upon the first mentioned rod acting against the second-mentioned rod and tending to move the same in one direction, and a buffer spring upon the first-mentioned rod between the said abutment member and the second-mentioned rod.

6. An intermittent feed mechanism comprising in combination a constantly-rotating member provided with a plurality of contact devices, a ratchet-wheel, a pivoted lever, a pawl on said lever engaging said ratchet-wheel, said lever projecting into the path of said contact devices whereby said lever will be intermittently rocked, means on said lever adapted to bear against one of said contact devices substantially until the next succeeding contact device strikes said lever, a spring for compelling a reverse rocking of the lever to a position in the path of such contact devices and a cushion for the retractile stroke of the lever.

7. In feeding mechanism for fertilizers, the combination with rotatable and oscillatory feeding elements; of a continuously rotating driving element intermittently actuating said elements, and longitudinally movable means for resiliently actuating and controlling said oscillatory feeding element relative to and independently of said driving element comprising a pair of relatively movable rods.

8. In feeding mechanism for fertilizers, the combination with rotatable and oscillatory feeding elements, of a continuously rotating driving element intermittently actuating said elements, and longitudinally movable means for resiliently actuating and controlling said oscillatory feeding element relative to and independently of said driving element, comprising a pair of rods relatively movable longitudinally, and a spring for cushioning the resilient retractile stroke of the oscillatory element.

9. In feeding mechanism for fertilizers, the combination with rotatable and oscillatory feeding elements, of a continuously rotating driving element for actuating the oscillatory element in one direction, and means for resiliently actuating and controlling the retractile stroke of the oscillatory element relatively to and independently of the driving element comprising an adjustable controller rod, a retracting spring and a rod extending forwardly from the oscillatory element, a stop-device for the second rod on the first-mentioned rod, and a spring applied to cushion the second rod.

In testimony whereof we affix our signatures.

HENRY SYNCK. [L. S.]
BRUCE B. ROLLMAN. [L. S.]